(12) United States Patent
Watanabe

(10) Patent No.: US 11,582,428 B2
(45) Date of Patent: Feb. 14, 2023

(54) REMOTE MONITORING SYSTEM, REMOTE MONITORING METHOD, AND REMOTE MONITORING SERVER

(71) Applicant: Woven Planet Holdings, Inc., Tokyo (JP)

(72) Inventor: Toshinobu Watanabe, Tokyo-to (JP)

(73) Assignee: WOVEN PLANET HOLDINGS, INC., Tokyo (JP)

(*) Notice: Subject to any disclaimer, the term of this patent is extended or adjusted under 35 U.S.C. 154(b) by 0 days.

(21) Appl. No.: 17/712,437

(22) Filed: Apr. 4, 2022

(65) Prior Publication Data

US 2022/0321841 A1    Oct. 6, 2022

(30) Foreign Application Priority Data

Apr. 5, 2021  (JP) .............................. JP2021-064382

(51) Int. Cl.
*H04N 5/272* (2006.01)
*G06V 20/58* (2022.01)
*H04N 7/18* (2006.01)

(52) U.S. Cl.
CPC .............. *H04N 7/183* (2013.01); *G06V 20/58* (2022.01); *H04N 5/272* (2013.01)

(58) Field of Classification Search
CPC .......... H04N 7/185; H04N 7/18; H04N 7/183; H04N 5/272; G06V 20/58
USPC ................... 348/143, 148, 149; 382/103, 104
See application file for complete search history.

(56) References Cited

U.S. PATENT DOCUMENTS

2014/0111647 A1* 4/2014 Atsmon ................. H04N 7/181
                                                          348/148
2019/0198540 A1   6/2019 Shibata et al.

FOREIGN PATENT DOCUMENTS

| JP | 2011-096063 A | 5/2011 |
| JP | 2018-056838 A | 4/2018 |
| JP | 2020-161039 A | 10/2020 |

* cited by examiner

*Primary Examiner* — Sherrie Hsia
(74) *Attorney, Agent, or Firm* — Sughrue Mion, PLLC

(57) ABSTRACT

The on-board information processing apparatus executes: detecting an object ahead of the vehicle from an image acquired by an on-board camera; compressing the image to generate a compressed image; transmitting first data including the compressed image and an image acquisition time of the image before compression; and transmitting second data including an object detection result and an image acquisition time of the image used for object detection. The remote monitoring server executes: receiving the first data to store it in a memory; receiving the second data to store it in the memory; extracting the compressed image and the object detection result whose image acquisition times are the same time from the memory in time series; and superimposing an extracted object detection result on a restored image acquired by restoring an extracted compressed image to display the restored image on which the object detection result is superimposed on a monitoring screen.

6 Claims, 12 Drawing Sheets

REMOTE MONITORING SYSTEM, REMOTE MONITORING METHOD, AND REMOTE MONITORING SERVER

CROSS-REFERENCE TO RELATED APPLICATION

The present application claims priority under 35 U.S.C. § 119 to Japanese Patent Application No. 2021-064382, filed Apr. 5, 2021, the contents of which application are incorporated herein by reference in their entirety.

BACKGROUND

Field

The present disclosure relates to a technique for remotely monitoring a vehicle.

Background Art

JP2020-161039A discloses a prior art related to a remote control device for remotely controlling an autonomous traveling vehicle which has become impossible to perform autonomous traveling. The remote control device according to the prior art, when displaying an image taken by a camera mounted on the autonomous traveling vehicle on a display unit, analyzes the taken image and highlights a specific object on the image.

The image taken by the camera is compressed and then transmitted from the autonomous traveling vehicle to the remote control device. Although compression of the image is indispensable for reducing a communication cost, the resolution of the image is lowered by being compressed. Therefore, in the above-mentioned prior art, the image cannot be analyzed with high accuracy, and highlighting of a specific object may not be appropriately performed.

As prior art documents representing the technical level of the technical field to which the present disclosure belongs, in addition to JP2020-161039A, JP2018-56838A and JP2011-96063A can be exemplified.

SUMMARY

The present disclosure has been made in view of the above-described problems. An object of the present disclosure is to provide a technique contributing to improvement of accuracy of a detection result of an object displayed on a monitor screen while reducing a communication cost.

The present disclosure provides a remote monitoring system. The remote monitoring system according to the present disclosure includes a camera mounted on a vehicle, an on-board information processing apparatus mounted on the vehicle and connected to the camera, and a remote monitoring server connected to the on-board information processing apparatus via a communication network. The on-board information processing apparatus executes an object detection process, a compression process, a first data transmission process, and a second data transmission process as mentioned below. The remote monitoring server executes a first data reception process, a second data reception process, an extraction process, and a display process as mentioned below.

In the object detection process by the on-board information processing apparatus, it is executed to detect an object ahead of the vehicle from an image acquired by the camera. In the compression process, the image is compressed to generate a compressed image. In the first data transmission process, first data including the compressed image and an image acquisition time of the image before compression is transmitted to the remote monitoring server. In the second data transmission process, second data including an object detection result and an image acquisition time of the image used for object detection is transmitted to the remote monitoring server.

In the first data reception process by the remote monitoring server, the first data transmitted from the on-board information processing apparatus is received and stored in a memory. In the second data reception process, the second data transmitted from the on-board information processing apparatus is received and stored in the memory. In the extraction process, the compressed image and the object detection result whose image acquisition times are the same time are extracted from the memory in time series. In the display process, an extracted object detection result is superimposed on a restored image acquired by restoring an extracted compressed image, and the restored image on which the extracted object detection result is superimposed is displayed on a monitoring screen.

In the present remote monitoring system, the on-board information processing apparatus may further execute third data transmission process, and the remote monitoring server may further execute third data reception process. In the third data transmission process, it is executed to transmit the third data including sensor information acquired from a sensor signal of a on board sensor and a signal acquisition time of the sensor signal. In the third data reception process, the third data transmitted from the on-board information processing apparatus is received and stored in the memory. In this case, in the extraction process by the remote monitoring server, the compressed image and the object detection whose image acquisition times are the same time are extracted from the memory in time series, and the sensor information whose signal acquisition time is the same time as the image acquisition times is extracted from the memory in time series. In the display process, an extracted sensor information is superimposed on the restored image together with the extracted object detection result, and the restored image on which the extracted object detection result and the extracted sensor information are superimposed is displayed on the monitoring screen.

Also, the present disclosure provides a remote monitoring method. The remote monitoring method according to the present disclosure is a method of remotely monitoring a vehicle using an on-board information processing apparatus and a remote monitoring server connected via a communication network. The remote monitoring method causes the on-board information processing apparatus to execute detecting an object ahead of the vehicle from an image acquired by a camera mounted on the vehicle, and compressing the image to generate a compressed image. The remote monitoring method causes the on-board information processing apparatus to further execute transmitting first data including the compressed image and an image acquisition time of the image before compression, and transmitting second data including an object detection result and an image acquisition time of the image used for object detection. Further, the remote monitoring method causes the remote monitoring server to execute receiving the first data to store the first data in a memory, and receiving the second data to store the second data in the memory. The remote monitoring method causes the remote monitoring server to further execute extracting the compressed image and the object detection result whose image acquisition times are the same time from the memory in time series, and superimposing an extracted object detection result on a restored image acquired by restoring an extracted compressed image to display the restored image on which the extracted object detection result is superimposed on a monitoring screen.

The remote monitoring method may cause the on-board information processing apparatus to execute transmitting third data including sensor information acquired from a sensor signal of an on-board sensor and a signal acquisition time of the sensor signal. The remote monitoring method may cause the remote monitoring server to execute receiving the third data to store the third data in the memory, extracting the compressed image and the object detection whose image acquisition times are the same time from the memory in time series, and extracting the sensor information whose signal acquisition time is the same time as the image acquisition times from the memory in time series. The remote monitoring method may cause the remote monitoring server to further execute superimposing an extracted sensor information on the restored image together with the extracted object detection result to display the restored image on which the extracted object detection result and the extracted sensor information are superimposed on the monitoring screen.

Further, the present disclosure provides a remote monitoring server. The remote monitoring server according to the present disclosure is a server connected to an on-board information processing apparatus via a communication network. The remote monitoring server includes at least one memory storing at least one program and at least one processor coupled to the at least one memory. The at least one program is configured to cause the at least one processor to perform the following process.

In processing executed by the at least one processor of the remote monitoring server, first data including a compressed image generated by compressing an image acquired by an on-board camera and an image acquisition time of the image before compression is received from the on-board information processing apparatus and stored in the at least one memory. In addition, second data including an object detection result based on the image and an image acquisition time of the image used for the object detection is received from the on-board information processing apparatus and stored in the at least one memory. Further, the compressed image and the object detection result whose image acquisition times are the same time are extracted from the at least one memory in time series. Further, an extracted object detection result is superimposed on a restored image acquired by restoring an extracted compressed image, and the restored image on which the extracted object detection result is superimposed is displayed on a monitoring screen.

Further, the present disclosure provides an on-board information processing apparatus. The on-board information processing apparatus according to the present disclosure is an apparatus connected to a remote monitoring server via a communication network. The on-board information processing apparatus includes at least one memory storing at least one program, and at least one processor coupled to the at least one memory. The at least one program is configured to cause the at least one processor to perform the following processing.

In the processing executed by the at least one processor of the present on-board information processing apparatus, detecting an object ahead of a vehicle from an image acquired by an on-board camera is executed. Further, a compressed image is generated by compressing the image. First data including the compressed image and an image acquisition time of the image before compression is transmitted to the remote monitoring server. Further, second data including an object detection result and an image acquisition time of the image used for object detection is transmitted to the remote monitoring server.

According to the present disclosure, since an object ahead of a vehicle is detected from an image before compression, it is possible to prevent deterioration of detection accuracy compared to the case where the object is detected from a compressed image. This contributes to improvement of accuracy of a detection result of an object displayed on a monitor screen while reducing a communication cost.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures that are described in the embodiments shown as follows are not always indispensable to the disclosure unless specially explicitly shown otherwise, or unless the disclosure is explicitly designated by the structures or the steps theoretically.

1. Schematic Configuration of Remote Monitoring System

Figure 1:
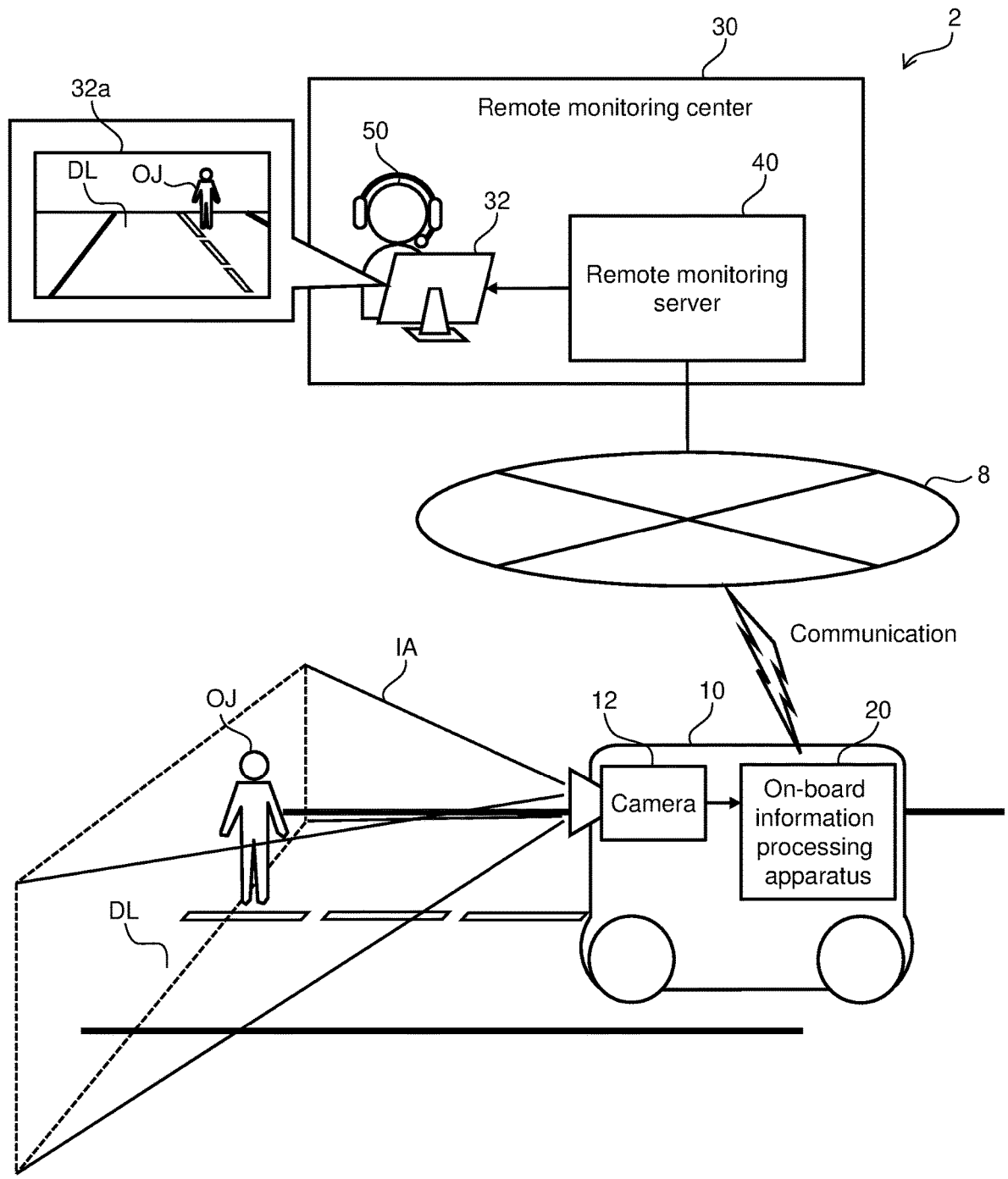
FIG. 1 is a diagram schematically illustrating a configuration of a remote monitoring system according to embodiments of the present disclosure.

FIG. 1 is a diagram schematically illustrating a configuration of a remote monitoring system according to embodiments of the present disclosure. The remote monitoring system 2 is a system for remotely monitoring a vehicle 10 traveling on a road by a remote operator 50. Remote monitoring in the present disclosure includes monitoring for remotely driving the vehicle 10, monitoring for remotely supporting the vehicle 10 traveling autonomously, according to the situation, and monitoring for confirming the surrounding environment of the vehicle 10 traveling autonomously.

The vehicle 10 to be remotely monitored is equipped with a camera 12. The camera 12 may be a stereo camera or a monocular camera. The imaging area IA of the camera 12 covers at least an area ahead of the vehicle 10 in the traveling direction. For example, if the vehicle 10 is traveling in the traveling lane DL, the area in front of the traveling lane DL and areas on both left and right sides thereof are included in the imaging area IA of the camera 12.

The vehicle 10 is equipped with an on-board information processing apparatus 20. An image taken by the camera 12 is input to the on-board information processing apparatus 20. The on-board information processing apparatus 20 is connected to a remote monitoring server 40 of the remote monitoring center 30 via a communication network 8. The communication network 8 includes a mobile communication network such as 4G and 5G. The image taken by the camera 12 is sent from the on-board information processing apparatus 20 to the remote monitoring server 40 via the communication network 8.

In the remote monitoring center 30, the image of the camera 12 sent from the on-board information processing apparatus 20 to the remote monitoring server 40 is displayed on a monitoring screen 32a of a display device 32. As the display device 32, for example, a liquid crystal display, an organic EL display, a head mount display, a touch panel can be used. The remote operator 50 can monitor ahead of the vehicle 10 by the image of the camera 12 projected on the monitoring screen 32a of the display device 32. For example, if an obstacle OJ is present in the imaging area IA of the camera 12, the remote operator 50 can recognize the presence of the obstacle OJ in the monitoring screen 32a of the display device 32.

The remote monitoring system 2 has a function of assisting the remote operator 50 to recognize the obstacle OJ. The obstacle OJ in the image of the camera 12 can be automatically detected by using an image analysis technique such as pattern matching and deep learning. By specifying the obstacle OJ in the image using this object detection function, it is possible to inform the remote operator 50 where the obstacle OJ exists in the monitor screen 32a.

On the other hand, the remote monitoring system 2 is required to reduce communication cost. The image taken by the camera 12 is encoded by the on-board information processing apparatus 20, and the encoded image data is transmitted to the remote monitoring server 40. In the encoding, the image taken by the camera 12 is compressed by a predetermined compression scheme. The image data transmitted from the on-board information processing apparatus 20 to the remote monitoring server 40 is decoded by the remote monitoring server 40. An image restored by decoding by the remote monitoring server 40 is displayed on the display device 32.

It should be noted that there is no limitation on the image transmission format, and there is no limitation on the image compression format. When the image transmission format is a moving image stream format, for example, H.264, H.265, VP8, VP9, VP10, and AV1 can be used as the image compression format. When the image transmission format is a format in which transmission is performed image by image, for example, JPEG, Motion JPEG and PNG can be used as the image compression format. Preferably, H.264, VP8, or VP9 is used. Motion JPEG, VP10 and AV1 are also suitable compression formats for the remote monitoring system 2.

2. Problem of Remote Monitoring System

As described above, the remote monitoring system 2 is required to assist the remote operator 50 by object detection from the image taken by the camera 12, and reduce communication cost by compression of the image taken by the camera 12. However, it is not easy to satisfy these two requirements simultaneously.

Figure 2:
FIG. 2 is an example of an image before compression for explaining a problem of a remote monitoring system.
Figure 3:
FIG. 3 is an example of an object detection result from an image before compression for explaining a problem of a remote monitoring system.
Figure 4:
FIG. 4 is an example of an image after compression for explaining a problem of a remote monitoring system.
Figure 5:
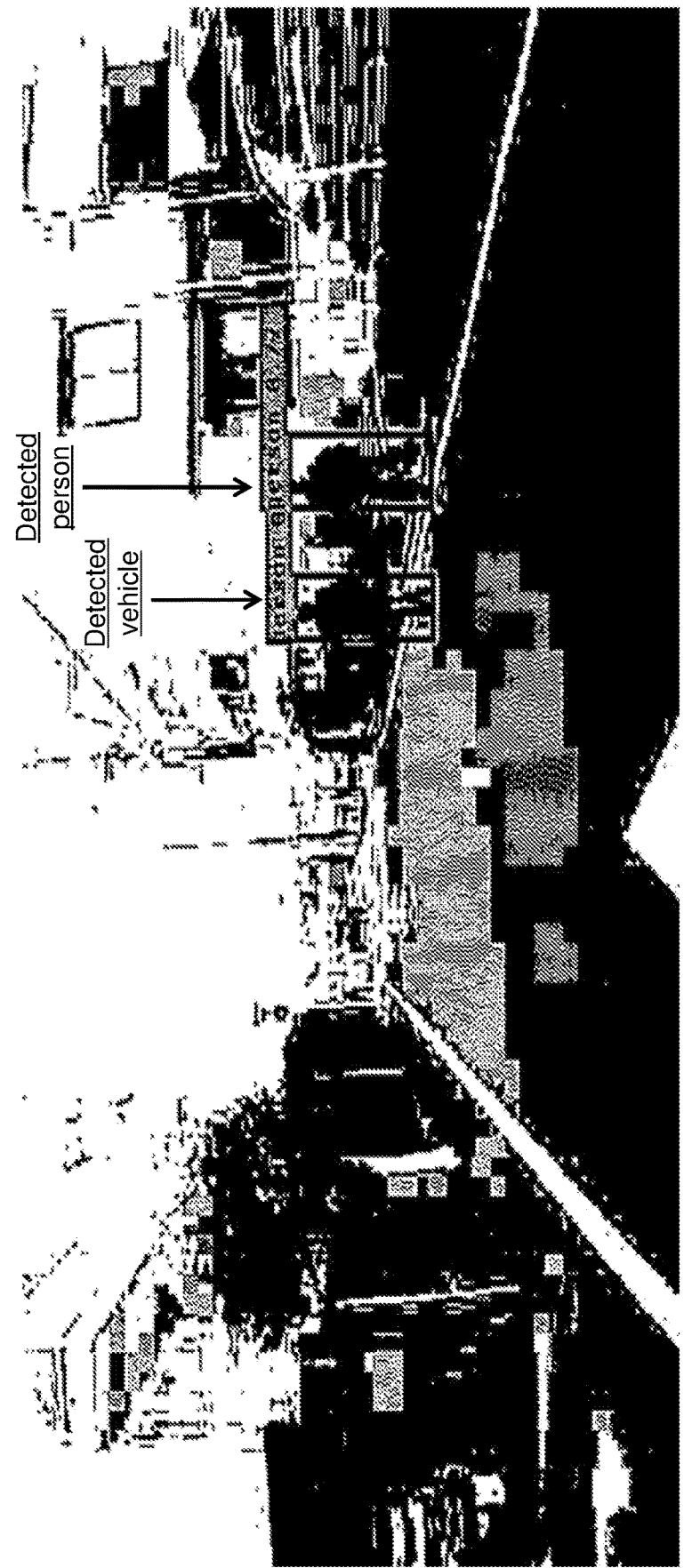
FIG. 5 is an example of an object detection result from an image after compression for explaining a problem of a remote monitoring system.

Here, four images are shown. FIG. 2 is an example of an original image taken by the camera 12, that is, an image before compression. FIG. 3 is an example of an object detection result from the original image shown in FIG. 2. FIG. 4 is an example of an image acquired by compressing the original image shown in FIG. 2, that is, an image after compression. FIG. 5 is an example of an object detection result from the image after compression shown in FIG. 4. However, these images are originally color images, but are binarized in these figures for the convenience of the application documents.

The image displayed on the monitor screen 32a of the display device 32 is the image after compression shown in FIG. 4. However, the resolution of the image after compression is lower than that of the original image. This is also evident from the binarized image, as can be seen from a comparison of the image shown in FIG. 2 with the image shown in FIG. 4. Therefore, as shown in FIG. 3, two persons and two vehicles are detected from the original image with high resolution, whereas two vehicles cannot be detected from the compressed image, as shown in FIG. 5.

As in the above example, an object to be detected may not be detected from the compressed image. In addition, although not in the above example, a non-existing object may be erroneously detected from the compressed image. That is, the image transmitted from the on-board information processing apparatus 20 to the remote monitoring server 40 needs to be compressed, but the object ahead of the vehicle 10 cannot be detected with high accuracy from the compressed image.

3. Outline of Features of Remote Monitoring System

Figure 6:
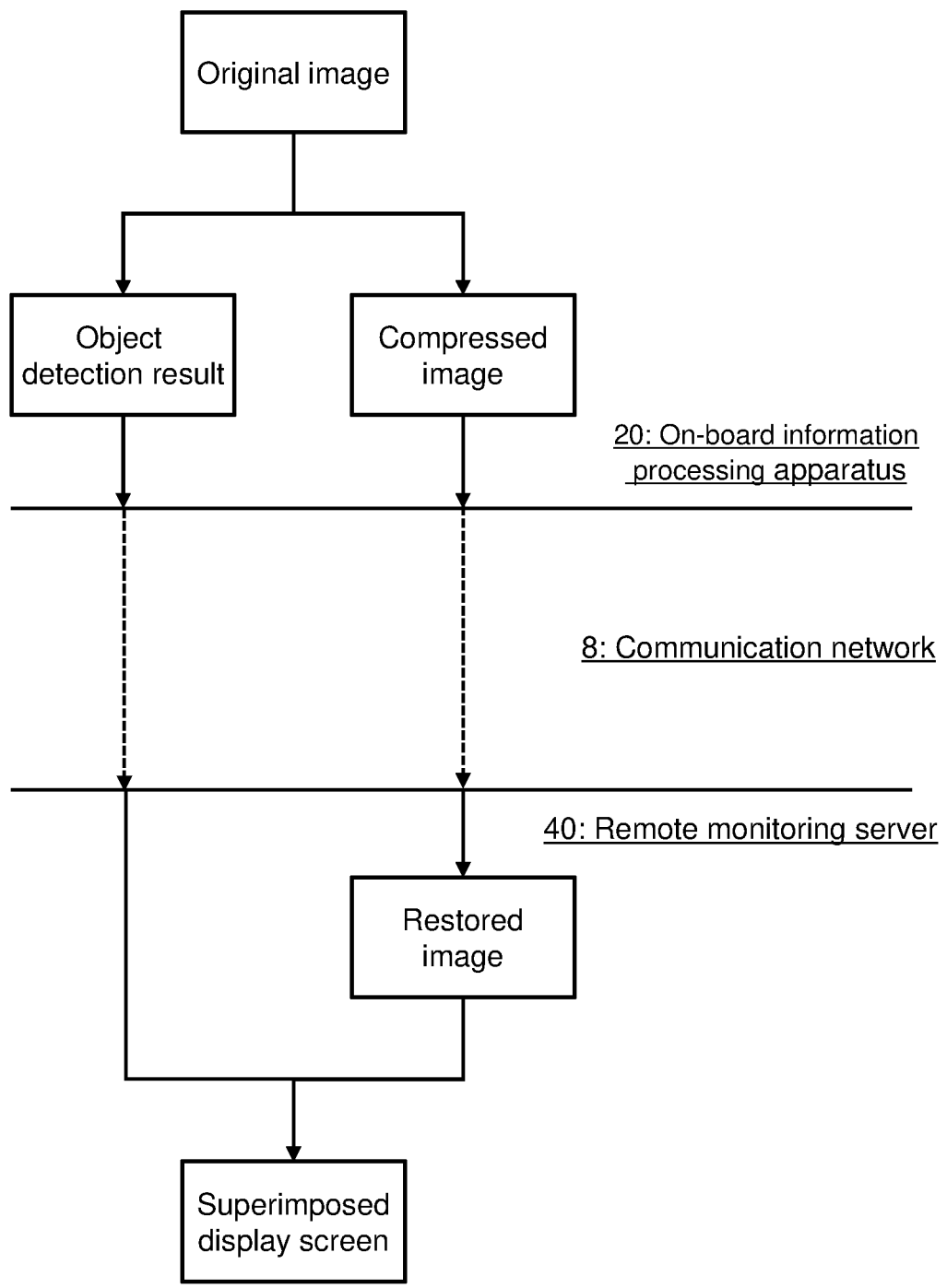
FIG. 6 is a diagram for explaining an outline of features of the remote monitoring system according to the embodiments of the present disclosure.

According to the remote monitoring system 2, the above-mentioned problem is solved as follows. FIG. 6 is a diagram for explaining an outline of features of the remote monitoring system 2.

FIG. 6 shows the flow of information in the remote monitoring system 2. In the remote monitoring system 2, a compressed image is acquired from an original image before compression by the on-board information processing apparatus 20. In parallel with this, an object detection result is acquired from the original image before compression by the on-board information processing apparatus 20. The compressed image and the object detection result acquired separately are transmitted separately from the on-board information processing apparatus 20 to the remote monitoring server 40 via the communication network 8. That is, in the remote monitoring system 2, the process of detecting the object from the image of the camera 12 is performed in the on-board information processing apparatus 20 before the transmission of the image to the remote monitoring server 40, and is performed not on the compressed image but on the original image before compression.

The compressed image transmitted from the on-board information processing apparatus 20 to the remote monitoring server 40 is restored by the remote monitoring server 40. The object detection result transmitted from the on-board information processing apparatus 20 separately from the compressed image is superimposed on the restored image by the remote monitoring server 40. As a result, a superimposed display screen in which the object detection result is superimposed on the restored image is acquired. As a specific example, the image after compression shown in FIG. 4 is displayed on the monitor screen 32a of the display device 32, and the object detection result shown in FIG. 3 is superimposed on the image.

According to the remote monitoring system 2 having the above features, by performing the object detection with respect to the original image before compression by the on-board information processing apparatus 20, it is possible to detect the object ahead of the vehicle 10 with high accuracy. By displaying the object detection result together with the compressed image on the monitor screen 32a of the display device 32, remote monitoring by the remote operator 50 can be assisted well.

Although compression process of the original image and object detection process from the original image are included in processing executed by the on-board information processing apparatus 20, they are executed separately. Therefore, even if the original images are common, there may be a difference between the time at which the compressed image is acquired and the time at which the object detection result is acquired. A time difference between the compressed image and the object detection result may mislead the remote operator 50.

The following chapters describe the detailed configuration and functions of the remote monitoring system 2. As described therein, the remote monitoring system 2 is technically devised so as not to cause a time difference between an image and an object detection result that are displayed on the display device 32.

4. Configuration of Vehicle According to First Embodiment

Figure 7:
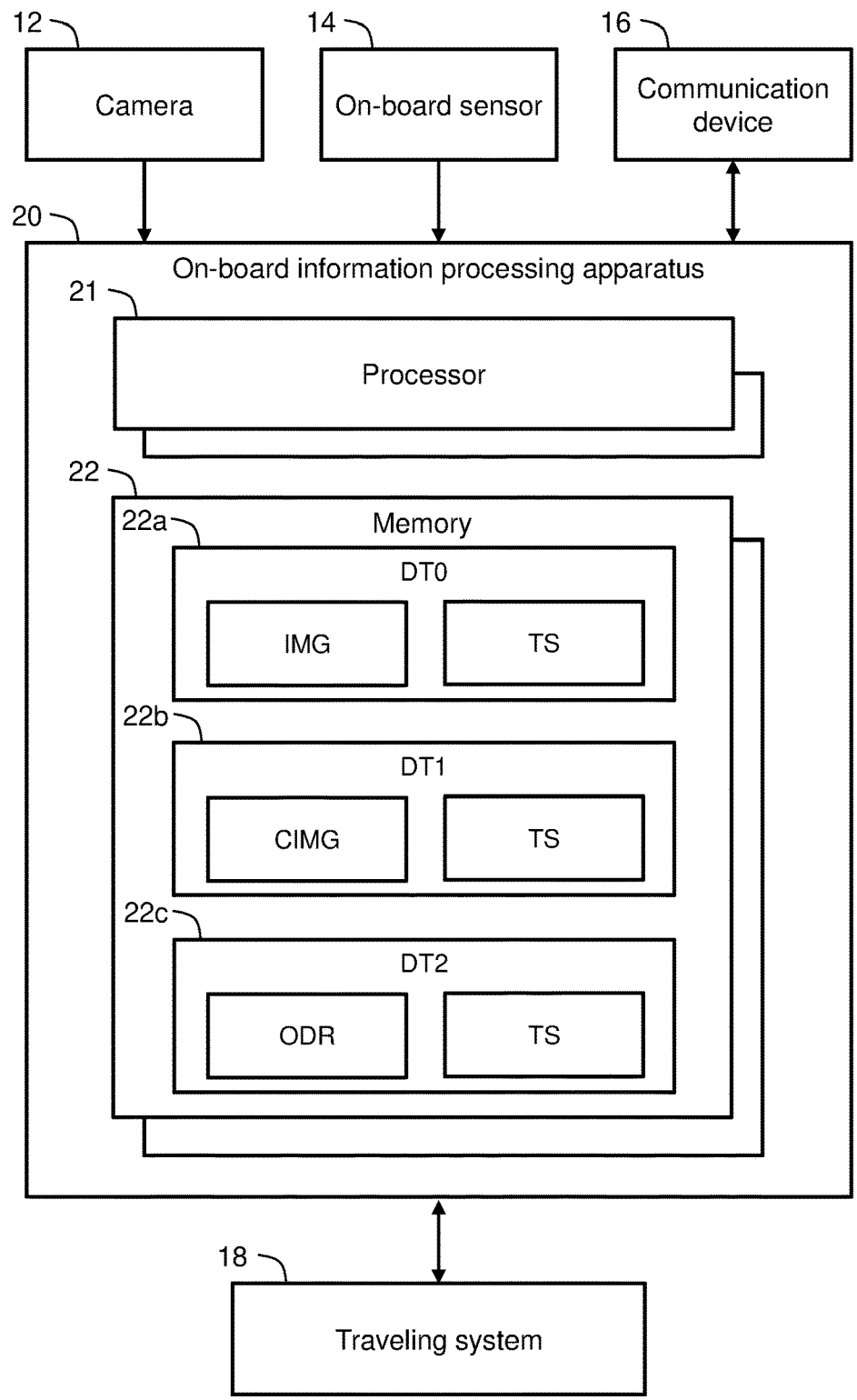
FIG. 7 is a block diagram showing a configuration of a vehicle according to a first embodiment of the present disclosure.

FIG. 7 is a block diagram showing a configuration of a vehicle 10 equipped with an on-board information processing apparatus 20 according to the first embodiment. The vehicle 10 comprises the on-board information processing apparatus 20, and further comprises a camera 12, an on-board sensor 14, a communication device 16, and a traveling system 18. The details of the camera 12 mounted on the vehicle 10 are as described above.

The on-board sensor 14 includes a state sensor for acquiring information about the motion of the vehicle 10. The state sensor includes, for example, at least one of a speed sensor, an acceleration sensor, a yaw rate sensor, and a steering angle sensor. Further, the on-board sensor 14 includes a position sensor for detecting the position and orientation of the vehicle 10. As the position sensor, a GPS (Global Positioning System) sensor is exemplified. Further, the on-board sensor 14 may include a recognition sensor other than the camera 12. The recognition sensor recognizes the surrounding condition of the vehicle 10. Examples of the recognition sensor include a LiDAR (Laser Imaging Detection and Ranging), a millimeter wave radar, and an ultrasonic sensor.

The communication device 16 communicates with the outside of the vehicle 10. The communication device 16 communicates with the remote monitoring server 40 via the communication network 8.

The traveling system 18 includes a steering system for steering the vehicle 10, a driving system for driving the vehicle 10, and a braking system for braking the vehicle 10. The steering system includes, for example, a power steering system, a steer-by-wire steering system, and a rear wheel steering system. The driving system includes, for example, an engine system, an EV system, and a hybrid system. The braking system includes, for example, a hydraulic brake and a power regenerative brake.

The on-board information processing apparatus 20 is an ECU (Electronic Control Unit) mounted on the vehicle 10 or an aggregate of a plurality of ECUs. The on-board information processing apparatus 20 includes at least one processor 21 (hereinafter simply referred to as a processor 21) and at least one memory 22 (hereinafter simply referred to as a memory 22) coupled to the processor 21. The memory 22 includes a main storage and an auxiliary storage. The memory 22 stores at least one program (hereinafter simply referred to as a program) executable by the processor 21 and various related information. When the processor 21 executes the program, various kinds of processing by the processor 21 are realized. The program may be stored in the main storage or in a computer-readable recording medium that is the auxiliary storage.

At least three storage areas 22a, 22b, and 22c are prepared in the memory 22. The processor 21 stores pre-processing data DT0 in the first storage area 22a of the memory 22. The pre-processing data DT0 includes an image IMG taken by the camera 12 and a time stamp TS indicating the time at which the image IMG was acquired. The processor 21 reads out the pre-processing data DT0 and executes the compression process. Furthermore, the processor 21 reads out the pre-processing data DT0 and executes the object detection process.

The processor 21 stores first processing data (hereinafter, referred to as first data) DT1 in the second storage area 22b of the memory 22. The first data DT1 includes a compressed image CIMG acquired by the compression process for the image IMG and the time stamp TS associated with the image IMG before compression. The processor 21 uses the communication device 16 to transmit the first data DT1 to the remote monitoring server 40.

The processor 21 stores second processing data (hereinafter, referred to as second data) DT2 in the third storage area 22c of the memory 22. The second data DT2 includes an object detection result ODR acquired by the object detection process for the image IMG and the time stamp TS associated with the image IMG used for object detection. The processor 21 uses the communication device 16 to transmit the second data DT2 to the remote monitoring server 40.

5. Configuration of Remote Monitoring Center According to First Embodiment

Figure 8:
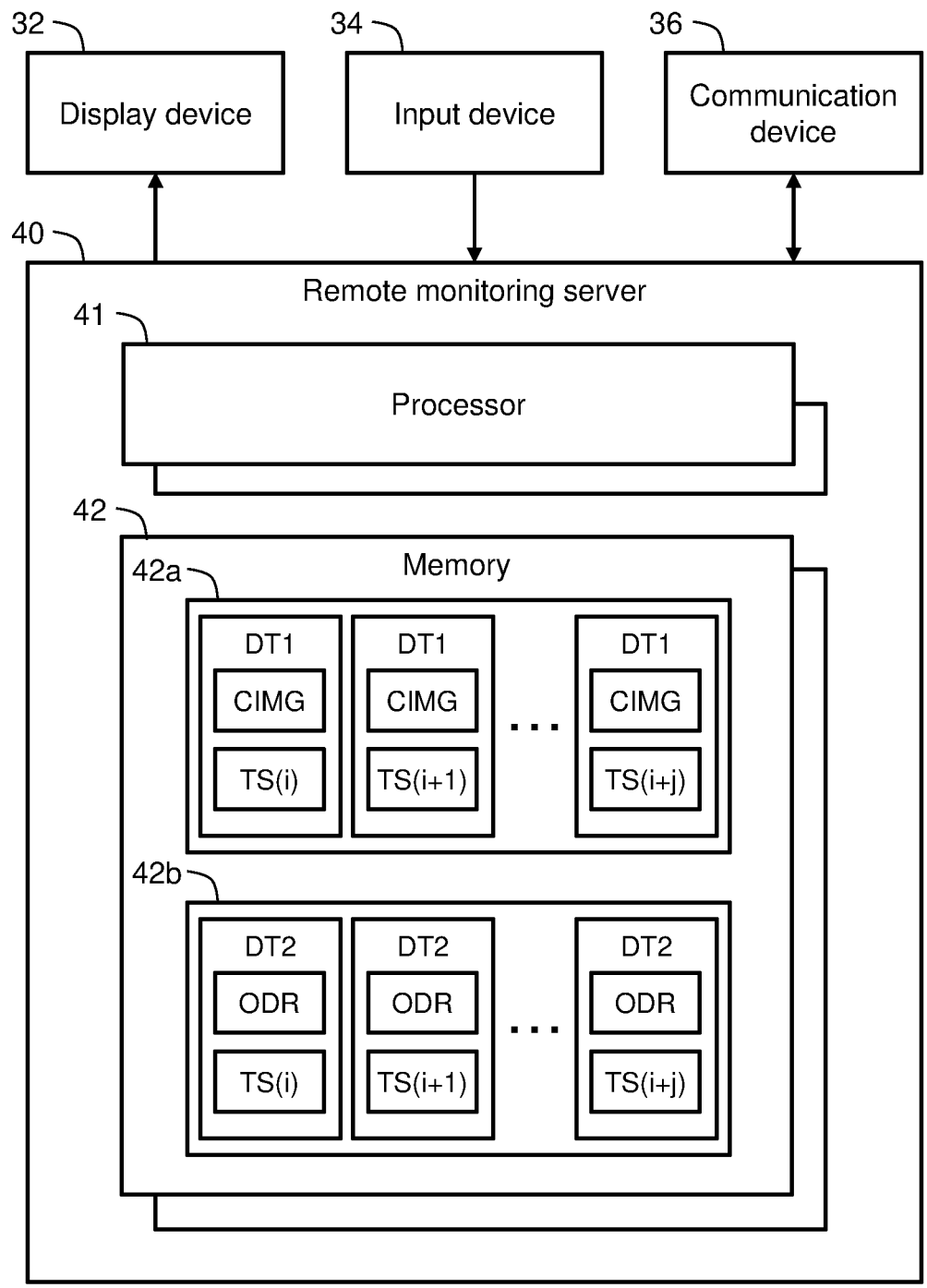
FIG. 8 is a block diagram showing a configuration of a remote monitoring center according to the first embodiment of the present disclosure.

FIG. 8 is a block diagram showing a configuration of the remote monitoring center 30 that includes the remote monitoring server 40 according to the first embodiment. The remote monitoring center 30 includes an input device 34 and a communication device 36 in addition to the remote monitoring server 40 and the display device 32. Similar to the display device 32, the input device 34 and the communication device 36 are connected to the remote monitoring server 40.

The input device 34 is an interface for receiving input from the remote operator 50. Examples of the input device 34 include a touch panel, a keyboard, and a mouse. Also, if remote monitoring is performed for remotely driving the vehicle 10, the input device 34 includes a driving operation member for the remote operator 50 to operate (steer, accelerate, and decelerate) the vehicle 10.

The communication device 36 communicates with the outside of the vehicle 10. The communication device 36 communicates with the on-board information processing apparatus 20 via the communication network 8.

The remote monitoring server 40 is a computer for the remote monitoring center 30 or an aggregation a plurality of computers. The remote monitoring server 40 includes at least one processor 41 (hereinafter simply referred to as a processor 41) and at least one memory 42 (hereinafter simply referred to as a memory 42) coupled to the processor 41. The memory 42 includes a main storage and an auxiliary storage. The memory 42 stores at least one program (hereinafter simply referred to as a program) executable by the processor 41 and various related information. When the processor 41 executes the program, various kinds of processing by the processor 41 are realized. The program may be stored in a main storage or in a computer-readable recording medium that is an auxiliary storage.

The memory 42 includes at least two queues 42a, 42b. Plural pieces of first data DT1 are stored in the first queue 42a. The processor 41 puts the latest first data DT1 in the first queue 42a and extracts the oldest first data DT1 at the head from the first queue 42a. The first queue 42a stores the first data DT1 from i-th to i+j-th in the order of the time stamp TS.

Plural pieces of second data DT2 are stored in the second queue 42b. The processor 41 puts the latest second data DT2 in the second queue 42b and extracts the oldest second data DT2 at the head from the second queue 42b. The second queue 42b stores the second data DT2 from i-th to i+j-th in the order of the time stamp TS. The processor 41 extracts the first data DT1 and the second data DT2 whose time stamps TS are the same time from the first queue 42a and the second queue 42b, respectively.

Figure 9:
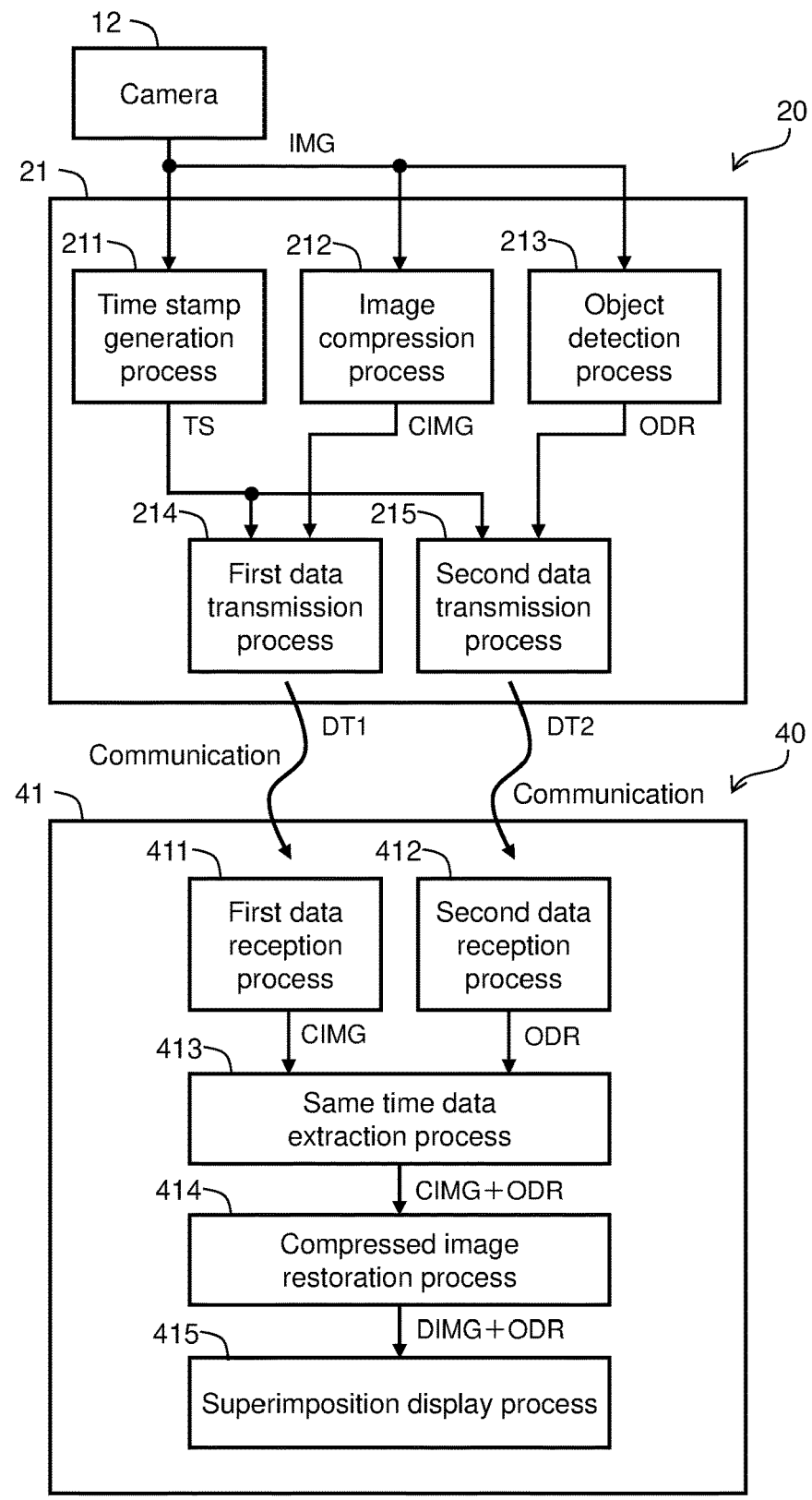
FIG. 9 is a block diagram showing processing executed by each processor of an on-board information processing apparatus and a remote monitoring server according to the first embodiment of the present disclosure.

6. Processing Executed by Remote Monitoring System According to First Embodiment FIG. 9 is a block diagram showing processing executed by the remote monitoring system 2 according to the first embodiment, more specifically, processing executed by the processors 21 and 41 of the on-board information processing apparatus 20 and the remote monitoring server 40. The flow of processing shown in this block diagram also represents the remote monitoring method according to the first embodiment of the present disclosure.

The processor 21 of the on-board information processing apparatus 20 executes a time stamp generation process 211, an image compression process 212, an object detection process 213, a first data transmission process 214, and a second data transmission process 215. These processes are executed by the processor 21 when the program stored in the memory 22 is executed by the processor 21.

In the time stamp generation process 211, the processor 21 generates a time stamp TS indicating the time at which an image IMG is acquired by the camera 12. The generated time stamp TS is associated with the image IMG and stored in the memory 22.

In the image compression process 212, the processor 21 reads out the image IMG taken by the camera 12 from the memory 22. Then, the processor 21 performs a predetermined compression process for the image IMG to generate a compressed image CIMG. The generated compressed image CIMG is stored in the memory 22 associated with the time stamp TS.

In the object detection process 213, the processor 21 reads out the image IMG taken by the camera 12 from the memory 22. The processor 21 detects an object ahead of the vehicle 10 from the image IMG by using an image analysis technique such as pattern matching or deep learning. The object detection result ODR is stored in the memory 22 associated with the time stamp TS.

In the first data transmission process 214, the processor 21 reads out the first data DT1 including the compressed image CIMG and the time stamp TS from the memory 22. The processor 21 transmits the first data DT1 to the remote monitoring server 40 using the communication device 16.

In the second data transmission process 215, the processor 21 reads out the second data DT2 including the object detection result ODR and the time stamp TS from the memory 22. The processor 21 transmits the second data DT2 to the remote monitoring server 40 using the communication device 16.

The processor 41 of the remote monitoring server 40 executes a first data reception process 411, a second data reception process 412, a same time data extraction process 413, a compressed image restoration process 414, and a superimposition display process 415. These processes are executed by the processor 41 when the program stored in the memory 42 is executed by the processor 41.

In the first data reception process 411, the processor 41 receives the first data DT1 from the on-board information processing apparatus 20 using the communication device 36. The processor 41 stores the received first data DT1 in the first queue 42a.

In the second data reception process 412, the processor 41 receives the second data DT2 from the on-board information processing apparatus 20 using the communication device 36. The processor 41 stores the received second data DT2 in the second queue 42b.

In the same time data extraction process 413, the processor 41 extracts the compressed image CIMG and the object detection result ODR whose time stamps TS are the same time from the respective queues 42a and 42b in time series.

In the compressed image restoration process 414, the processor 41 restores the compressed image CIMG extracted together with the object detection result ODR in a restoration method corresponding to the compression method, and generates a restored image DIMG.

In the superimposition display process 415, the processor 41 superimposes the object detection result ODR on the restored image DIMG, and displays the restored image DIMG on which the object detection result ODR is superimposed on the monitor screen 32a of the display device 32. Since the restored image DIMG and the object detection result ODR have the time stamps TS of the same time, there is no time difference between the image and the object detection result that are displayed on the display device 32.

7. Configuration of Vehicle According to Second Embodiment

Figure 10:
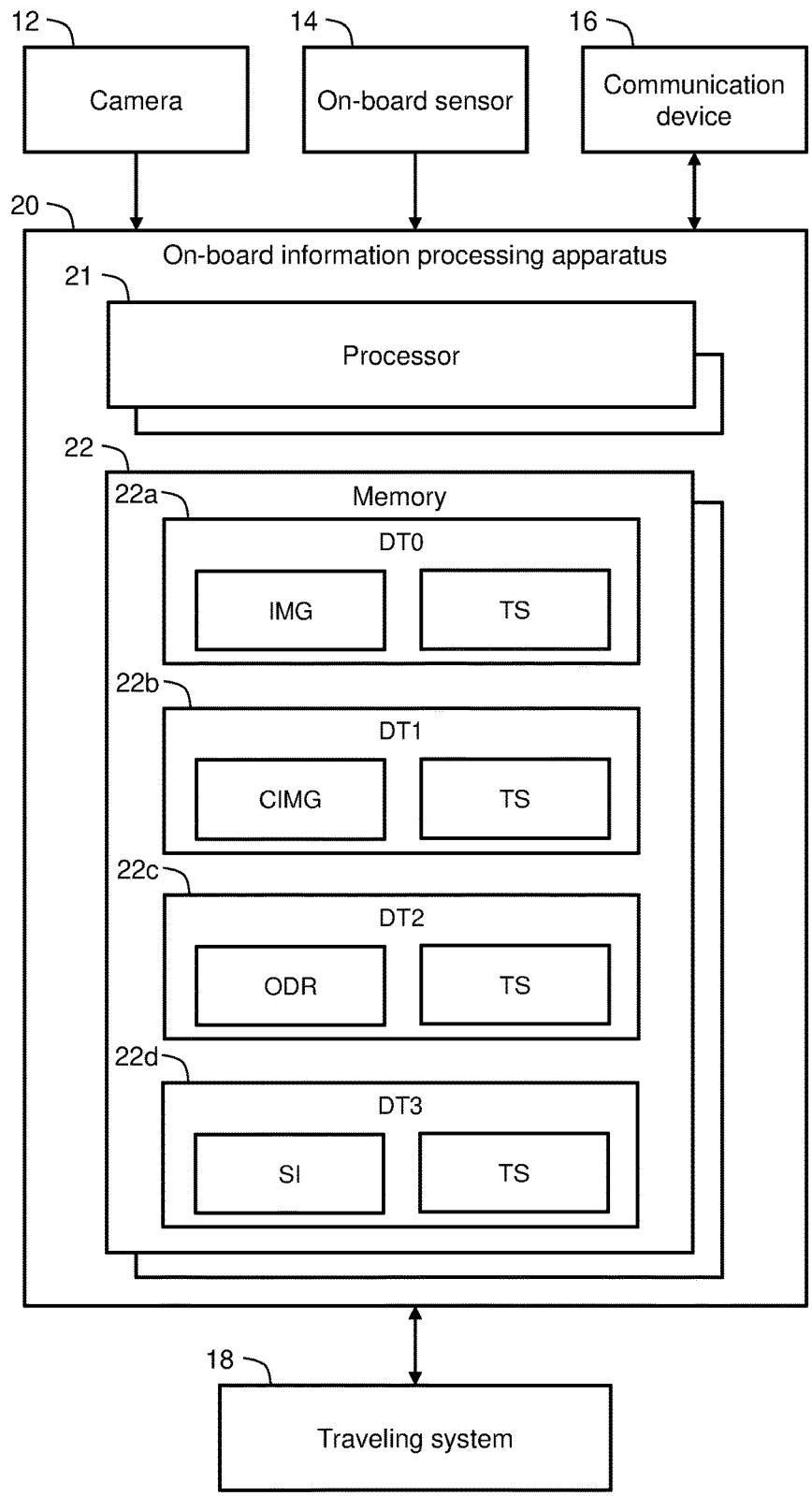
FIG. 10 is a block diagram showing a configuration of a vehicle according to a second embodiment of the present disclosure.

FIG. 10 is a block diagram showing a configuration of a vehicle 10 equipped with an on-board information processing apparatus 20 according to the second embodiment. In FIG. 10, the same elements as those of the vehicle 10 according to the first embodiment are denoted by the same reference numerals. Descriptions of the previously described configurations and functions will be omitted or simplified.

Among the information acquired from the sensor signal of the on-board sensor 14 (hereinafter referred to as sensor information) also includes information useful to present to the remote operator 50. Examples of the sensor information includes a LiDAR image acquired by imaging a LiDAR sensor signal, and information about the distance and orientation of an object acquired from sensor signals of a millimeter wave radar and an ultrasonic sensor. They are crucial information for the remote operator 50 to know the driving environment of the vehicle 10. In the second embodiment, processing for acquiring the sensor information from sensor signals is executed in the on-board information processing apparatus 20. In the second embodiment, the sensor information is transmitted from the on-board information processing apparatus 20 to the remote monitoring server 40. The remote monitoring server 40 superimposes the sensor information on the restored image together with the object detection result, and displays the restored image on which the object detection result and the sensor information are superimposed on the display device 32.

In the second embodiment, at least four storage areas 22a, 22b, 22c, and 22d are prepared in the memory 22. As in the first embodiment, the first storage area 22a stores pre-processing data DT0 including an image IMG taken by the camera 12 and a time stamp TS indicating the time at which the image IMG is acquired. The second storage area 22a stores first data DT1 including a compressed image CIMG acquired by the compression process for the image IMG and the time stamp TS associated with the image IMG before compression. The third storage area 22c stores second data DT2 including an object detection result ODR acquired by the object detection process for the image IMG and the time stamp TS associated with the image IMG used for object detection.

The processor 21 stores third processing data (hereinafter, referred to as third data) DT3 in the fourth storage area 22d of the memory 22. The third data DT3 includes sensor information SI acquired from a sensor signal of the on-board sensor 14, and the time stamp TS indicating the acquisition time of the sensor signal. The processor 21 uses the communication device 16 to transmit the third data DT3 to the remote monitoring server 40.

8. Configuration of Remote Monitoring Center According to Second Embodiment

Figure 11:
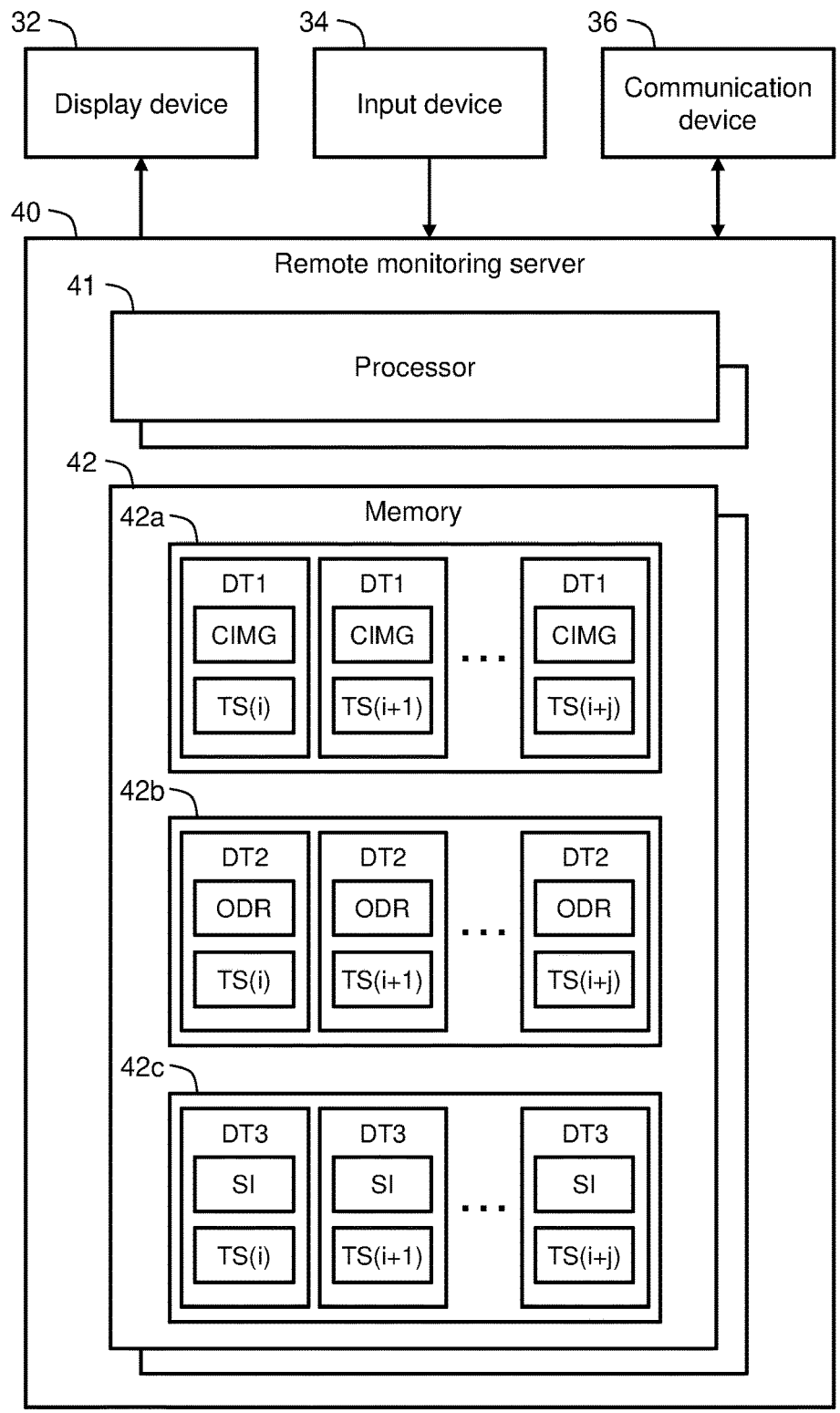
FIG. 11 is a block diagram showing a configuration of a remote monitoring center according to the second embodiment of the present disclosure.

FIG. 11 is a block diagram showing a configuration of the remote monitoring center 30 that includes the remote monitoring server 40 according to the second embodiment. In FIG. 10, the same elements as those of the remote monitoring center 30 according to the first embodiment are denoted by the same reference numerals. Descriptions of the previously described configurations and functions will be omitted or simplified.

In the second embodiment, the memory 42 includes at least three queues 42a, 42b, and 42c. As in the first embodiment, the first queue 42a stores the first data DT1 from i-th to i+j-th in the order of the time stamp TS. The second queue 42b stores the second data DT2 from i-th to i+j-th in the order of the time stamp TS.

The third queue 42b newly prepared in the second embodiment stores plural pieces of third data DT3. The processor 41 puts the latest third data DT3 in the third queue 42c and extracts the oldest third data DT3 at the head from the third queue 42c. The third queue 42c stores the third data DT3 from i-th to i+j-th in the order of the time stamp TS. The processor 41 extracts the first data DT1, the second data DT2, and the third data DT3 whose time stamps TS are the same time from the first queue 42a, the second queue 42b, and the third queue 42c, respectively.

Figure 12:
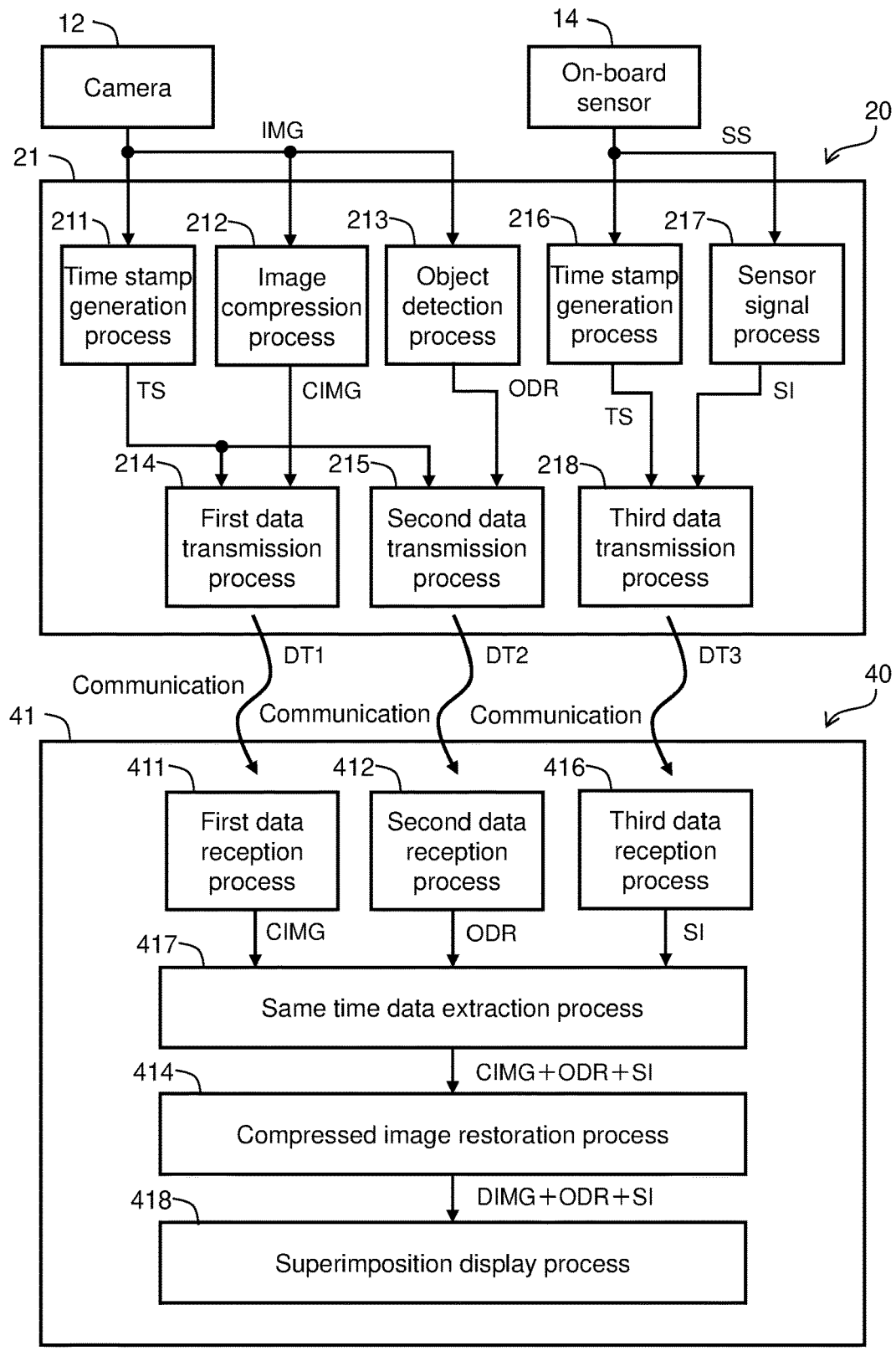
FIG. 12 is a block diagram showing processing executed by each processor of an on-board information processing apparatus and a remote monitoring server according to the second embodiment of the present disclosure.

9. Processing Executed by Remote Monitoring System According to Second Embodiment FIG. 12 is a block diagram showing processing executed by the remote monitoring system 2 according to the second embodiment, more specifically, processing executed by the processors 21 and 41 of the on-board information processing apparatus 20 and the remote monitoring server 40. The flow of processing shown in this block diagram also represents the remote monitoring method according to the second embodiment of the present disclosure. In FIG. 10, the same processes as those executed in the first embodiment are denoted by the same reference numerals. Descriptions of the previously described processes are omitted or simplified.

In addition to the processes executed in the first embodiment, the processor 21 of the on-board information processing apparatus 20 according to the second embodiment executes a time stamp generation process 216, a sensor signal process 217, and a third data transmission process 218. As with other processes, these processes are executed by the processor 21 when the program stored in the memory 22 is executed by the processor 21.

In the time stamp generation process 216, the processor 21 generates a time stamp TS indicating the time at which a sensor signal SS is acquired from the on-board sensor 14. The generated time stamp TS is stored in the memory 22 in association with the sensor signal SS.

In the sensor signal process 217, the processor 21 generates sensor information SI from the sensor signal SS. The sensor information SI includes, for example, a LiDAR image acquired from a LiDAR sensor signal, and range information and orientation information acquired from sensor signals of a millimeter-wave radar and an ultrasonic sensor. The generated sensor information SI is stored in the memory 22 in association with the time stamp TS associated with the sensor signal SS.

In the third data transmission process 218, the processor 21 reads out the third data DT3 including the sensor data SI and the time stamp TS from the memory 22. The processor 21 transmits the third data DT3 to the remote monitoring server 40 using the communication device 16.

The processor 41 of the remote monitoring server 40 according to the second embodiment executes a third data reception process 416 in addition to the processes executed in the first embodiment. In addition, the processor 41 executes a same time data extraction process 417 and a superimposition display process 418, which are changed with respect to the processes executed in the first embodiment. As with other processes, these processes are executed by the processor 41 when the program stored in the memory 42 is executed by the processor 41.

In the third data reception process 416, the processor 41 receives the third data DT3 from the on-board information processing apparatus 20 using the communication device 36. The processor 41 stores the received third data DT3 in the third queue 42c.

In the same time data extraction process 417, the processor 41 extracts the compressed image CIMG, the object detecting result ODR, and the sensor information SI whose time stamps TS are the same time from the respective queues 42a, 42b, and 42c in time series.

In the superimposition display process 418, the processor 41 superimposes the object detection result ODR and the sensor information SI on the restored image DIMG, and displays the restored image DIMG on which the object detection result ODR and the sensor information SI are superimposed on the monitor screen 32a of the display device 32. Since the restored image DIMG, the object detection result ODR, and the sensor information SI have the time stamps TS of the same time, there is no time difference between the image, the object detection result, and the sensor information that are displayed on the display device 32.

What is claimed is:

1. A remote monitoring system comprising:
a camera mounted on a vehicle;
an on-board information processing apparatus mounted on the vehicle and connected to the camera; and
a remote monitoring server connected to the on-board information processing apparatus via a communication network, wherein:
the on-board information processing apparatus is configured to execute:
an object detection process of detecting an object ahead of the vehicle from an image acquired by the camera;
a compression process of compressing the image to generate a compressed image;
a first data transmission process of transmitting first data including the compressed image and an image acquisition time of the image before compression; and
a second data transmission process of transmitting second data including an object detection result and an image acquisition time of the image used for object detection; and
the remote monitoring server is configured to execute:
a first data reception process of receiving the first data to store the first data in a memory;
a second data reception process of receiving the second data to store the second data in the memory;
an extraction process of extracting the compressed image and the object detection result whose image acquisition times are a same time from the memory in time series; and
a display process of superimposing an extracted object detection result on a restored image acquired by restoring an extracted compressed image to display the restored image on which the extracted object detection result is superimposed on a monitoring screen.

2. The remote monitoring system according to claim 1, wherein:
the on-board information processing apparatus is configured to further execute a third data transmission process of transmitting third data including sensor information acquired from a sensor signal of an on-board sensor and a signal acquisition time of the sensor signal;
the remote monitoring server is configured to further execute a third data reception process of receiving the third data to store the third data in the memory;
the extraction process includes extracting the compressed image and the object detection result whose image acquisition times are a same time from the memory in time series and extracting the sensor information whose signal acquisition time is a same time as the image acquisition times from the memory in time series; and
the display process includes superimposing an extracted sensor information on the restored image together with the extracted object detection result to display the restored image on which the extracted object detection result and the extracted sensor information are superimposed on the monitoring screen.

3. A method of remotely monitoring a vehicle using an on-board information processing apparatus and a remote monitoring server connected via a communication network, the method comprising:
causing the on-board information processing apparatus to execute:
detecting an object ahead of the vehicle from an image acquired by a camera mounted on a vehicle;
compressing the image to generate a compressed image;
transmitting first data including the compressed image and an image acquisition time of the image before compression; and
transmitting second data including an object detection result and an image acquisition time of the image used for object detection; and
causing the remote monitoring server to execute:
receiving the first data to store the first data in a memory;
receiving the second data to store the second data in the memory;
extracting the compressed image and the object detection result whose image acquisition times are a same time from the memory in time series; and
superimposing an extracted object detection result on a restored image acquired by restoring an extracted compressed image to display the restored image on which the extracted object detection result is superimposed on a monitoring screen.

4. The method according to claim 3, further comprising:
causing the on-board information processing apparatus to further execute transmitting third data including sensor information acquired from a sensor signal of an on-board sensor and a signal acquisition time of the sensor signal;
causing the remote monitoring server to further execute receiving the third data to store the third data in the memory;
extracting the compressed image and the object detection result whose image acquisition times are a same time from the memory in time series and extracting the sensor information whose signal acquisition time is a same time as the image acquisition times from the memory in time series; and
superimposing an extracted sensor information on the restored image together with the extracted object detection result to display the restored image on which the extracted object detection result and the extracted sensor information are superimposed on the monitoring screen.

5. A remote monitoring server connected to an on-board information processing apparatus via a communication network, the remote monitoring server comprising:
at least one memory storing at least one program; and
at least one processor coupled with the at least one memory,
wherein the at least one program is configured to cause the at least one processor to execute:
receiving first data including a compressed image generated by compressing an image acquired by an on-board camera and an image acquisition time of the image before compression from the on-board information processing apparatus to store the first data in the at least one memory;
receiving second data including an object detection result based on the image and an image acquisition time of the image used for object detection from the on-board information processing apparatus to store the second data in the at least one memory;
extracting the compressed image and the object detection result whose image acquisition times are a same time from the at least one memory in time series; and
superimposing an extracted object detection result on a restored image acquired by restoring an extracted compressed image to display the restored image on which the extracted object detection result is superimposed on a monitoring screen.

6. The remote monitoring server according to claim 5, wherein the at least one program is configured to cause the at least one processor to further execute:
  receiving third data including sensor information acquired from a sensor signal of an on-board sensor and a signal acquisition time of the sensor signal to store the third data in the at least one memory;
  extracting the compressed image and the object detection result whose image acquisition times are a same time from the memory in time series and extracting the sensor information whose signal acquisition time is a same time as the image acquisition times from the at least one memory in time series; and
  superimposing an extracted sensor information on the restored image together with the extracted object detection result to display the restored image on which the extracted object detection result and the extracted sensor information are superimposed on the monitoring screen.

* * * * *